United States Patent [19]

Murdock

[11] Patent Number: 4,672,518
[45] Date of Patent: Jun. 9, 1987

[54] CURRENT MODE CONTROL ARRANGEMENT WITH LOAD DEPENDENT RAMP SIGNAL ADDED TO SENSED CURRENT WAVEFORM

[75] Inventor: James H. Murdock, Denville, N.J.

[73] Assignee: American Telephone and Telegraph Co., AT&T Bell Labs, Murray Hill, N.J.

[21] Appl. No.: 890,440

[22] Filed: Jul. 30, 1986

[51] Int. Cl.[4] .......................................... H02M 3/335
[52] U.S. Cl. ..................................... 363/21; 323/285; 363/80
[58] Field of Search ....................... 363/21, 19, 26, 80, 363/97; 323/285

[56] References Cited

U.S. PATENT DOCUMENTS 4,150,424 4/1979 Nuechterlein ......................... 363/26

FOREIGN PATENT DOCUMENTS

EP21867 1/1981 European Pat. Off. .............. 363/21

12029 1/1983 Japan ..................................... 363/21

OTHER PUBLICATIONS

"Simple Switching Control Method Changes Power Converter Into a Current Source", Cecil W. Deisch, PESC '78 Record, IEEE Power Electronics Specialists Conference-1978, pp. 300–306.

Primary Examiner—William H. Beha, Jr.
Attorney, Agent, or Firm—Alfred G. Steinmetz

[57] ABSTRACT

A switching converter in which current mode voltage regulation is implemented includes circuitry to add ramp compensation to the sensed current signal at light load and reduce or disable this ramp signal compensation at heavy load. This load dependent ramp signal improves the stability of operation of the converter and maintains its inherent current limit performance over a wide range of loading. An alternative connection allows for disabling the current sense signal and hence, transforming the current mode to voltage mode control under light load.

9 Claims, 3 Drawing Figures

CURRENT MODE CONTROL ARRANGEMENT WITH LOAD DEPENDENT RAMP SIGNAL ADDED TO SENSED CURRENT WAVEFORM

FIELD OF THE INVENTION

This invention relates to voltage and current regulated power supply circuits and more particularly to such circuits using current mode regulation techniques.

BACKGROUND OF THE INVENTION

Current mode regulation techniques are frequently used in switching power converters as a means of controlling the duty ratio of the power switch. Current flow through a power switch is monitored and the power switch is turned off when its current level reaches a predetermined threshold value. This control technique has many advantages including permitting reliable operation of the power switch at close to its operational limit. The sensed current through the power switch normally has a trapezoidal wave shape. It has been found that the reliable and stable operation of the converter is enhanced when a ramp waveform signal is summed with the sensed current trapezoidal waveform. However, a ramp signal found suitable for one load condition of the power converter may create problems at another load condition (i.e. light load versus heavy load). Such problems may include over current shutdown latch up and wide range swings of the current limit inception knee when a particular ramp signal is inappropriate for the present load condition.

BRIEF SUMMARY OF THE INVENTION

Therefore a power converter, embodying the principles of the invention, includes current mode control circuitry in which ramp signal application to the sensed current trapezoidal waveform is dependent upon and responsive to changes in load condition. At light loads a suitable ramp is added to the sensed current trapezoid. This ramp is either not applied or reduced in amplitude at heavy loads. In the illustrative embodiment the load condition controlling application of the ramp signal is determined by the magnitude of the sensed current signal output of the power switch.

BRIEF DESCRIPTION OF THE DRAWING

An understanding of the invention may be readily attained by referring to the following specification and its accompanying drawing in which.

DETAILED DESCRIPTION

Figure 1:
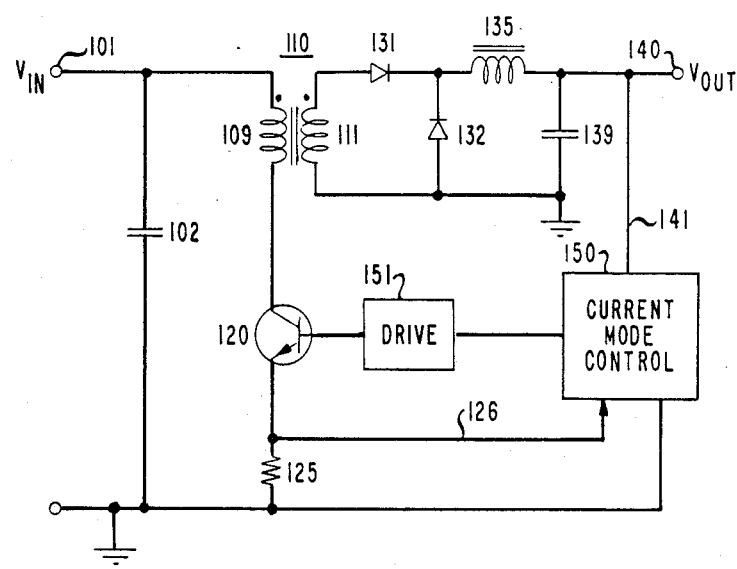
FIG. 1 is a schematic of a power converter embodying the principles of the invention.

A buck type forward converter embodying the principles of the invention is shown in FIG. 1. While a buck converter is shown in the illustrative example, this technique may be used in any type of switching converter. A dc voltage input terminal 101 is periodically connected to a primary winding 109 of power transformer 110 by a periodic initiation of conduction through power transistor 120. During conducting intervals of transistor 120 power is supplied from the secondary winding 111 through a rectifying diode 131 and filter inductor 135 to a load connected to the output terminal 140. When transistor 120 is nonconducting current continues to flow through the flyback diode 132 and through inductor 135. Since forward converters are well known in the art it is believed unnecessary to describe the operation of the power train in detail.

Current flow through the transistor 120 is measured by observing a voltage across current sensing resistor 125. This observed voltage is applied by lead 126 to a current mode control circuit 150. The output voltage is sensed at output terminal 140 and this sensed voltage is also applied to the current mode control circuit via lead 141. The current mode control circuit 150 utilizes the sensed output voltage and observed transistor current voltage to regulate the output voltage at terminal 140 by controlling a duty cycle of the switching transistor 120. Voltage control is achieved by utilizing a voltage error signal, derived by determining a deviation of the output voltage from its regulated value, in order to generate an error voltage which in turn determines the threshold voltage. Upon the attainment of the threshold by the sensed current signal through transistor 120, it is biased into its nonconducting state thereby controlling its duty cycle and regulating the output voltage. The output of the current mode control circuit is applied to the drive circuit 151 which applies the appropriate bias signals to transistor 120. The current mode control circuit 150 also includes a clock source which is utilized to periodically initiate conduction in transistor 120.

Figure 2:
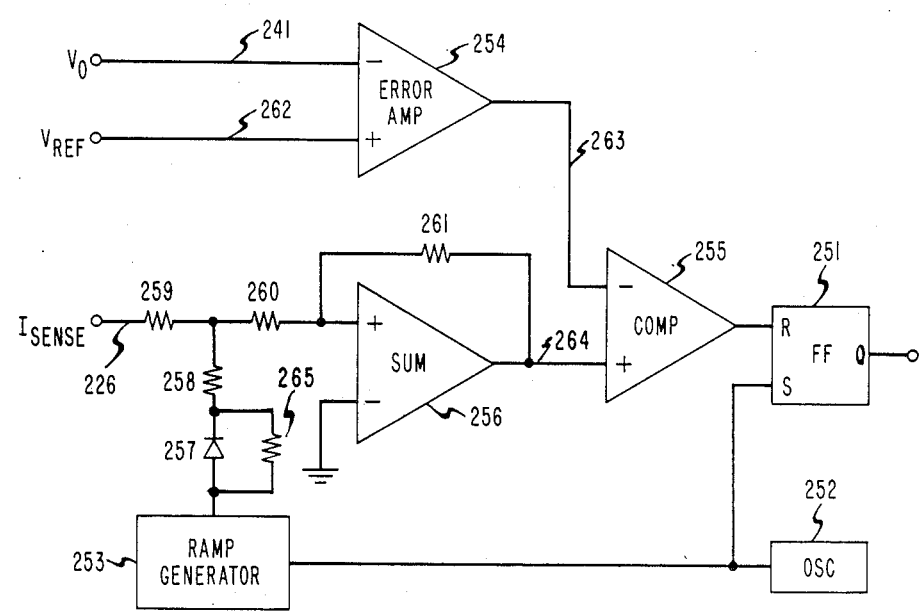
FIG. 2 is a schematic of a current mode control circuit included in the circuit shown in FIG. 1.

The current mode control circuit and associated drive circuit is shown in more detail in FIG. 2. Periodic clock pulses are supplied by oscillator 252 which has its output applied to RS flip flop 251, which in turn operates as a driver to control the power transistor of the converter. The output of oscillator 252 is also applied to a ramp generator 253 to control the periodic ramp waveform generator.

A sensed output voltage of the converter is scaled down and applied to lead 241 which is connected to an input of error amplifier 254. A reference voltage is also applied to lead 262 of the error amplifier 254. The output of error amplifier 254 is an error signal indicating a deviation at an output of the converter from its regulated value. This error signal is applied to an inverting input 263 of a comparator circuit 255.

A voltage representing the current flow in the power transistor is applied to the current sense lead 226 and is in turn connected via resistors 259 and 260 to the noninverting input of a summing amplifier 256 which includes a feedback resistor 261.

A ramp generator 253, responsive to oscillator 252 to generate periodic ramp waveforms, has its output coupled via diode 257 and resistor 258 to the junction of the resistors 259 and 260 and coupled through resistor 260 to the noninverting input of the summing amplifier 256. A resistor 265 is shown shunted across diode 257. This resistor is high in impedance and is optional. It is not considered for this immediate description but as described herein below it is added if ramp compensation is desired at heavy load. The output of summing amplifier 256 is connected to the noninverting input 264 of the comparator 255. The output of the comparator 255 is applied to the reset input of RS flip flop 251 whose output in turn controls the conductivity state of transistor 120 shown in FIG. 1.

In operation, the error amplifier 254 provides an error voltage which establishes a threshold at the inverting input 263 of comparator 255 to facilitate the current mode control. The voltage waveform of the sensed current signal is coupled through the summing amplifier 256 where it may or may not be summed with a ramp voltage supplied by ramp generator 253. The sum output of summing amplifier 256 is applied to the noninverting input 264 of comparator 255. Conduction of transistor 120 is initiated when oscillator 252 sets the RS flip flop 251. Transistor 120 continues to conduct until the sum output of summing amplifier 256 at lead 264 equals the error voltage at lead 263 where upon the comparator 255 resets RS flip flop causing transistor 120 to be biased nonconducting.

At certain load conditions, particularly at light loads, it is desirable to add a ramp voltage to the current sense signal, but at heavy load conditions this low load ramp signal is disadvantageous. The ramp generator 253 is coupled to summing amplifier 256 via a diode 257 and two resistors 258 and 260. Resistor 260 is selected to have a much higher impedance than either of the resistors 258 and 259. The ramp voltage and current sense voltage is summed at the noninverting input of summing amplifier whenever the diode 257, connecting the ramp generator to the summing amplifier is forward biased. Should it be back biased, the ramp signal is disconnected (i.e. in the absence of resistor 265) and only the current sense signal is applied to summing amplifier 256. Conductivity of the diode 257 is dependent on the magnitude of the sensed current which in turn is dependent on load conditions. At light loads the voltage signal representing the sensed transistor current is relatively low in magnitude and diode 257 is forward biased allowing the ramp signal to be summed with the sensed current signal. At heavy loads the diode 257 becomes reversed biased and (in the absence of resistor 265) the addition of ramp compensation to the sensed current signal is disabled. The exact point at which the application of the ramp to the summing amplifier is disabled may be controlled by proper selection of impedance values for resistors 259, 260 and 258. It is readily apparent that no ramp compensation is provided at a heavy load when it could adversely modify the current limit characteristic of the converter and yet at light load the ramp needed to insure stability of operation is provided. Optional resistor 265 is shunted across diode 257 if a smaller version of the ramp is required at heavy load, and resistor 265 is relatively high in impedance.

Figure 3:
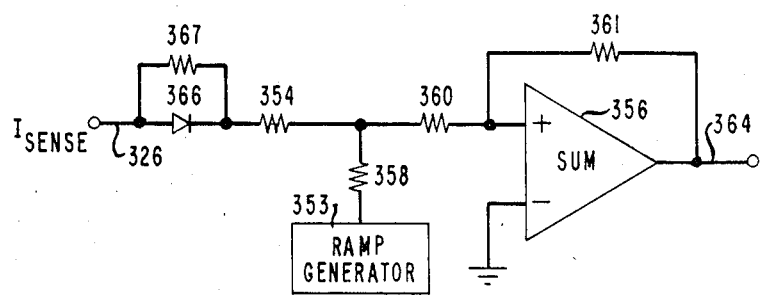
FIG. 3 is a schematic of a control circuit variation of the current mode control circuit of FIG. 2 that may be included in the circuit shown in FIG. 1.

A variation of this ramp control arrangement is shown in FIG. 3 wherein the current sense waveform at lead 326 is coupled to the summing amplifier 356 via diode 366. Again, an optional resistor 367 is shown shunting diode 366; however, its effect is not considered in the immediate following description. The ramp signal is coupled directly from the ramp generator 353 to the summing amplifier 356 via resistors 358 and 360. In this particular arrangement the current sense signal is disabled from application to the summing amplifier 356 at light loads and at heavier loads the converter operates in a current mode with ramp compensation. At light loads regulation is by direct duty cycle control through normal voltage regulation techniques. If optional resistor 367 is added and it is high in impedance, then regulation is no longer by direct duty cycle control, but it is similar in operation as it is now current mode control with very large ramp compensation at light loads.

In summary, with the optional resistors 265 and 367 present, the alternatives in FIGS. 2 and 3 are similar in having a large ramp relative to current sense voltage signal at lighter loads, and a smaller ramp relative to current sense voltage at heavy loads. In the extreme the optional resistors are removed, and there is no ramp compensation at heavy loads for FIG. 2 and no current sense voltage signal at lighter loads for FIG. 3.

What is claimed is:

1. A switching power converter circuit, comprising an input for accepting a source of electrical energy, an output for coupling to a load to be energized, a power switch for controlling power flow from the input to the output,
means for periodically enabling the power switch, means for supplying a control threshold voltage, means for sensing a current flow through the power switch and providing a proportionate current feedback signal,
means for generating a ramp signal,
means for summing the ramp signal with the current feedback signal,
means responsive to a magnitude of the current feedback signal for controlling a magnitude of the ramp signal applied to the means for summing whereby the magnitude of the ramp signal is high when the current feedback signal is low in magnitude and the magnitude of the ramp signal is low when the current feedback signal is high in magnitude, and
means responsive to an output of the means for summing for disabling the power switch when the output of the means for summing attains a control threshold voltage.

2. A switching power converter as defined in claim 1 wherein the means responsive to a magnitude of the current feedback signal for controlling a magnitude of the ramp signal includes a diode switch coupling the means for providing a proportionate current feedback signal to the means for summing, and
a resistor network for coupling the ramp signal to the means for summing.

3. A switching power converter as defined in claim 2 and further including a high impedance resistor shunted across the diode switch.

4. A switching power converter circuit as defined in claim 1, 2 or 3 and further including;
means for generating an error voltage proportionate to a difference between a voltage level at the output and a desired regulated value at the output voltage, and
the means for supplying including means for deriving the control threshold voltage from the error voltage.

5. A converter circuit comprising;
an input and an output,
a power switch periodically enabled to interconnect the input and the output,
means for regulating a voltage level at the output including,
means for generating a current control signal proportionate to a difference between a voltage regulation value and the voltage level at the output,
means for sensing a current in the power switch and producing a current feedback signal proportionate to current flow in the power switch, a ramp waveform source,
means for controlling a magnitude of the ramp waveform in response to a magnitude of the current feedback signal,
means for summing the ramp waveform with the current feedback signal, and means for comparing an output of the means for summing with the current control signal and disabling the power switch when the output of the means for summing achieves equality with the current control signal.

6. A converter circuit as defined in claim 5 wherein the means for controlling includes diode switch means for coupling the ramp waveform to the means for summing when the current feedback signal is below a predetermined threshold and decoupling the ramp waveform from the means for summing when the current feedback at least equals the predetermined threshold.

7. A converter circuit as defined in claim 6 wherein the means for coupling and decoupling further includes a resistive network responsive to the current feedback signal magnitude for biasing the diode switch.

8. A converter circuit as defined in claim 5 wherein the means for controlling includes means for reducing a magnitude of the ramp waveform proportionate to an increase in magnitude of the current feedback signal.

9. A converter circuit as defined in claim 8 wherein the means for controlling include a high impedance and diode switch connected in shunt with each other and coupling the ramp waveform source to the means for summing.

* * * * *